(12) United States Patent
Vanderydt et al.

(10) Patent No.: US 12,309,033 B2
(45) Date of Patent: May 20, 2025

(54) NETWORK TIMING TOPOLOGY DISCOVERY AND VISUALIZATION USING INTERIOR GATEWAY PROTOCOLS

(71) Applicant: Ciena Corporation, Hanover, MD (US)

(72) Inventors: Gregory Vanderydt, Ottawa (CA); Kevin Estabrooks, Nepean (CA); Bashar Abdullah, Kanata (CA)

(73) Assignee: Ciena Corporation, Hanover, MD (US)

( * ) Notice: Subject to any disclaimer, the term of this patent is extended or adjusted under 35 U.S.C. 154(b) by 281 days.

(21) Appl. No.: 17/405,180

(22) Filed: Aug. 18, 2021

(65) Prior Publication Data

US 2023/0057463 A1 Feb. 23, 2023

(51) Int. Cl.
*H04L 41/12* (2022.01)
*H04L 41/22* (2022.01)
*H04L 43/106* (2022.01)

(52) U.S. Cl.
CPC .............. *H04L 41/12* (2013.01); *H04L 41/22* (2013.01); *H04L 43/106* (2013.01)

(58) Field of Classification Search
CPC ....... H04L 41/12; H04L 41/22; H04L 43/106; H04J 3/0641; H04J 3/0679; H04J 3/12; H04J 3/14; H04J 3/0661; H04J 3/0644; H04J 3/065; H04J 3/0658; H04J 3/0667
See application file for complete search history.

(56) References Cited

U.S. PATENT DOCUMENTS

| | | | |
|---|---|---|---|
| 7,333,508 B2 | 2/2008 | Rabie et al. | |
| 7,406,088 B2 | 7/2008 | Magd et al. | |
| 7,417,995 B2 | 8/2008 | Rabie et al. | |
| 7,565,436 B2 | 7/2009 | Rabie et al. | |
| 8,018,841 B2 | 9/2011 | Holness et al. | |
| 8,305,938 B2 | 11/2012 | Holness et al. | |
| 8,687,633 B2 | 4/2014 | Rabie et al. | |
| 9,026,674 B1 * | 5/2015 | Kanna | H04L 43/04 709/239 |
| 9,401,817 B2 | 7/2016 | Holness et al. | |
| 9,836,931 B1 | 12/2017 | Rivaud et al. | |
| 9,843,439 B2 | 12/2017 | Rivaud et al. | |
| 9,847,752 B2 | 12/2017 | Rivaud et al. | |
| 10,012,811 B2 | 7/2018 | Rivaud et al. | |
| 10,247,895 B2 | 4/2019 | Rivaud et al. | |

(Continued)

FOREIGN PATENT DOCUMENTS

| | | |
|---|---|---|
| EP | 2 460 320 B1 | 4/2015 |
| EP | 2 417 735 B1 | 6/2017 |
| EP | 2 430 798 B1 | 8/2018 |

*Primary Examiner* — Sai Aung
*Assistant Examiner* — Angelie T Ngo
(74) *Attorney, Agent, or Firm* — Baratta Law PLLC; Lawrence A. Baratta, Jr.

(57) ABSTRACT

Systems and methods include receiving Interior Gateway Protocol (IGP) messages from one or more network elements in a network; extracting timing information from any of the IGP messages where the timing information includes timing reference for a given network element for any of frequency, phase, and time; and storing the timing information. The steps can further include one of displaying a Graphical User Interface of the network including an operational timing trail for any of frequency, phase, and time; and displaying the timing information for the one or more network elements via a Command Line Interface (CLI).

20 Claims, 4 Drawing Sheets

(56) References Cited

U.S. PATENT DOCUMENTS

| | | | |
|---|---|---|---|
| 10,263,609 | B2 | 4/2019 | Estabrooks et al. |
| 10,355,799 | B2 | 7/2019 | Abdullah et al. |
| 10,594,395 | B2 | 3/2020 | Abdullah et al. |
| 10,764,659 | B2 | 9/2020 | Vanderydt et al. |
| 10,834,265 | B1* | 11/2020 | Antunes ................. H04L 65/80 |
| 10,855,623 | B2 | 12/2020 | Estabrooks et al. |
| 10,972,338 | B2 | 4/2021 | Civil et al. |
| 11,849,016 | B1* | 12/2023 | Wang ................. H04L 43/0858 |
| 2003/0095761 | A1 | 5/2003 | Nisbet et al. |
| 2005/0141509 | A1 | 6/2005 | Rabie et al. |
| 2011/0142078 | A1* | 6/2011 | Wong .................... H04J 3/0679 370/503 |
| 2013/0039220 | A1* | 2/2013 | Ruffini ................. H04J 3/0679 370/255 |
| 2015/0381408 | A1* | 12/2015 | Kompella ........... H04L 41/0836 370/222 |
| 2016/0315855 | A1* | 10/2016 | Chen ...................... H04L 45/12 |
| 2019/0141056 | A1 | 5/2019 | Estabrooks et al. |
| 2020/0220803 | A1* | 7/2020 | Zheng .................. H04L 45/123 |
| 2020/0366752 | A1* | 11/2020 | White ................. G06F 11/3409 |
| 2021/0144082 | A1* | 5/2021 | Bisht ........................ H04L 41/12 |
| 2022/0200894 | A1* | 6/2022 | Carnes, III .............. H04L 45/24 |

* cited by examiner

NETWORK TIMING TOPOLOGY DISCOVERY AND VISUALIZATION USING INTERIOR GATEWAY PROTOCOLS

FIELD OF THE DISCLOSURE

The present disclosure generally relates to networking. More particularly, the present disclosure relates to systems and methods for network timing topology discovery and visualization using Interior Gateway Protocols.

BACKGROUND OF THE DISCLOSURE

With emerging 5G applications over packet networks, timing has become more critical in such networks. A network timing trail includes a path in which timing is distributed in a network (e.g., a packet network). Solutions exist to visualize the timing trail, but they require that a management station, such as a Network Management System (NMS), logs in to each individual network element to solicit timing operational information and then this information is aggregated and processed to form a visualization of the timing trail. Alternatively, network operators must log in to nodes one at a time using a Command Line Interface (CLI) to trace the overall timing trail based on knowing which link is selected as primary reference, which adjacent element is the other side of the link representing the selected reference, and then recursively logging in to adjacent nodes to discover the current timing trail. This must potentially be repeated for frequency, phase, and time timing trails. Note, as described herein, nodes and network elements can be used interchangeably.

The disadvantage of the conventional approaches include the need for the management station to collect timing operational information, requiring constant connectivity, interaction, and frequent polling between the management station and each network element. Also, management stations are often vendor specific, unable to log into other vendor's network elements, and typical packet networks can include multi-vendor implementations. A timing topological view (i.e., the hierarchical view of timing information that comprises individual timing trails) is available only on the management station and not on any network element. This offers a particular limitation to troubleshooting in times of network crisis which is often performed by top level network engineers logging in to network elements by command line interface. Logging into a network element CLI, only provides local timing information and provides neither network level timing topology nor how the network element fits into the timing topology. As the timing trail may traverse network elements in differing administrative scope, the network operator may not have CLI access to all elements required to discover the entire timing trail. Tracing the timing trails for frequency, phase, and time by hop-by-hop CLI discovery would be cumbersome and in a case of changing network conditions may yield a stale outcome.

BRIEF SUMMARY OF THE DISCLOSURE

The present disclosure relates to systems and methods for network timing topology discovery and visualization using Interior Gateway Protocols. The present disclosure includes leveraging an Interior Gateway Protocol (IGP) to distribute the topology information of a frequency, phase, and time of day clock distribution network topology. As IGPs and variants of IGPs can be extended to serve as the control plane for Layer 1 networks (example OTN), layer 2 networks (example ethernet and provider link state bridging), layer 3 networks (example IP, MPLS, Segment Routing), and beyond, this includes leveraging the IGP or similar dynamic routing protocol to distribute the timing information where network timing operates simultaneously with a number of possible packet transport and dynamic control protocol technology combinations. In particular, the present disclosure extends IGP link state updates to include information about the clock selection status of a link. With the link state updates, it is possible to have a processing device participate in the link state updates to receive updates related to the timing trail topology in real time. As the topology changes, the processing device receives timing topology changes in real time, rather than having to go out and poll the network elements for timing information.

In various embodiments, the present disclosure includes a method having steps, a network element with a plurality of ports interconnected via a switching fabric and at least one processor configured to implement the steps, and a non-transitory computer-readable medium having instructions stored thereon for programming at least one processor to perform the steps. The steps include receiving Interior Gateway Protocol (IGP) messages from one or more network elements in a network; extracting timing information from any of the IGP messages where the timing information includes timing reference for a given network element for any of frequency, phase, and time; and storing the timing information. The steps can further include displaying a Graphical User Interface of the network including an operational timing trail for any of frequency, phase, and time. The steps can further include displaying the timing information for the one or more network elements via a Command Line Interface (CLI).

The at least one processor can be in a network element of the one or more network elements. The IGP can include one of Open Shortest Path First (OSPF), Routing Information Protocol (RIP), Intermediate System to Intermediate System (ISIS) and Enhanced Interior Gateway Routing Protocol (EIGRP). The IGP messages can include HELLO packets or link state update packets. The one or more network elements can be configured to insert the timing information into the IGP messages, and wherein the network can include a second set of one or more network elements that are not configured to insert the timing information. The steps can further include ignoring the extracting of the timing information from IGP messages from the second set. The at least one processor can be in a processing device that is separate from the one or more network elements and that is configured to participate in receiving the IGP messages.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for network timing topology discovery and visualization using Interior Gateway Protocols. The present disclosure includes leveraging an Interior Gateway Protocol (IGP) to distribute the topology information of a frequency, phase, and time of day clock distribution network topology. In particular, the present disclosure extends IGP link state updates to include information about the clock selection status of a link. With the link state updates, it is possible to have a processing device participate in the link state updates to receive updates related to the timing trail topology in real time. As the topology changes, the processing device receives timing topology changes in real time, rather than having to go out and poll the network elements for timing information. This disclosure includes embodiments where a subset of network elements implement this process but must interoperate with network elements in the same network that support the underlying IGP or dynamic control plane but not this invention. In this case, this invention provides a view of the timing topology for those sections of the network in which network elements support the invention while providing of view of the ingress and egress points of the sections of the network that do not.

Advantageously, the present disclosure provides network operators the ability to efficiently extract the timing topology of the network for visualization and analysis. There is simplicity in troubleshooting by achieving "one stop" topology information collection mechanisms while eliminating dependency on a management station and the management network to maintain a view of the timing topology. This provides a singular information model inherent to the IGP versus maintaining a YANG model or Resource Adaptor (RA) per device type to obtain the timing topology information. Also, this approach provides a performance gain relative to polling 1 to n network elements and by decreased access and operational information polling of network elements to retrieve timing operational status. This provides faster convergence to an accurate view of the timing topology by removing reliance on a polling cycle.

Network

Figure 1:
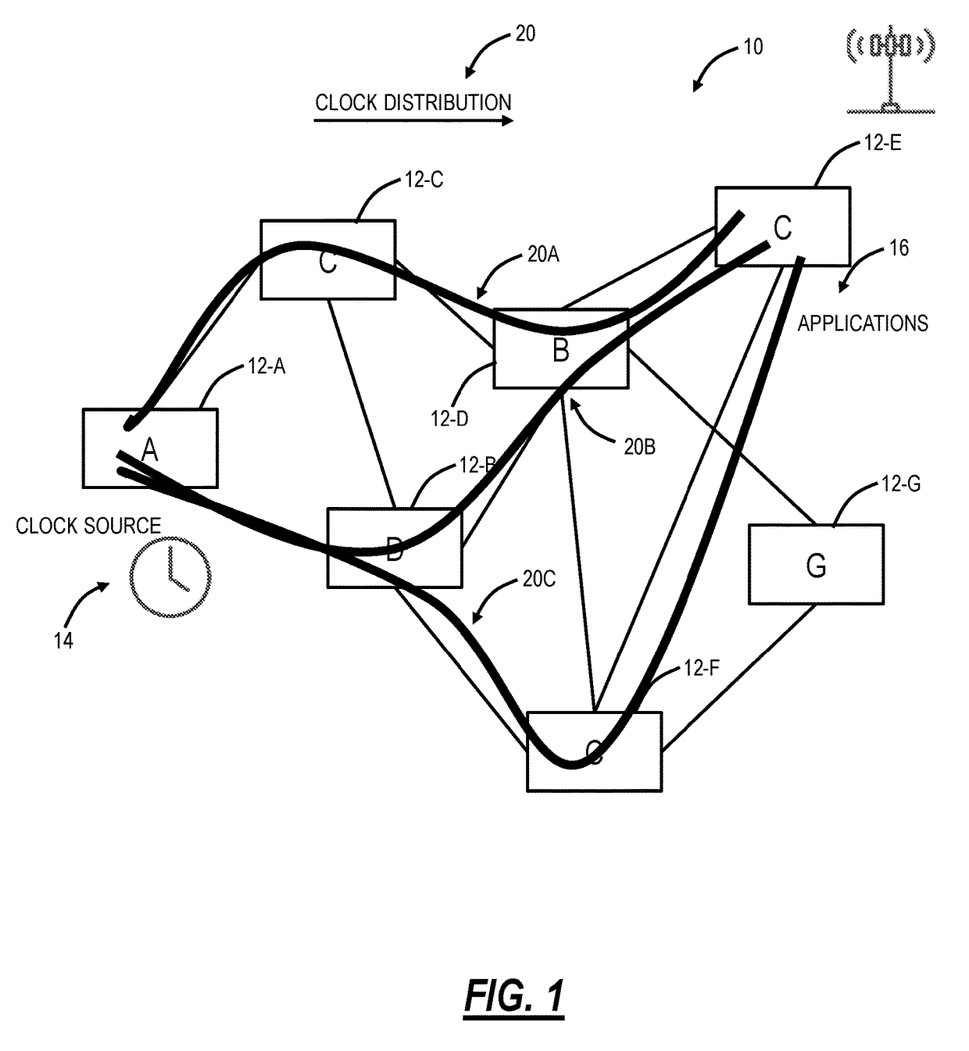
FIG. 1 is a network diagram of a network of various network elements, illustrating distribution of a clock.

FIG. 1 is a network diagram of a network 10 of various network elements 12-A-12-G, illustrating distribution of a clock 14. The network elements 12 can be packet switches, routers, packet-optical transport systems, or any other type of network device. Assume clock distribution 20 is from the network element 12-A towards the network element 12-E, i.e., applications 16 are at the network elements 12-E, 12-G, and the clock source 14 is at the network element 12-A. Of note, there are multiple possible paths 20 to distribute timing in the network 10, from the network element 12-A towards the network element 12-E. These are different timing trails and each could have different characteristics.

IEEE 1588v2 (2008), IEEE Standard for a Precision Clock Synchronization Protocol for Networked Measurement and Control Systems, the contents of which are incorporated by reference, referred to as Precision Time Protocol (PTP) is a common technique to synchronize clocks throughout a network. ITU-T Recommendation G.8273.2: Timing characteristics of telecom boundary clocks and telecom time slave clocks for use with full timing support from the network, October 2020, and ITU-T Recommendation G.8273.4: Timing characteristics of telecom boundary clocks and telecom time slave clocks for use with partial timing support from the network, March 2020, the contents of each are incorporated by reference, define a class of a device in order for downstream applications to identify whether the accuracy of the clock is within 5 ns (Class D), 10 ns (Class C), 30 ns (Class B), or 50 ns (Class A) of its clock reference. This can be referred to herein as the G.8273.2 or G.8273.4 class.

Timing is critical for 5G applications 16 where the packet network 10 is used to interoperate in a 5G Radio Access Network (RAN) for fronthaul applications, where Radio Units (RUs) and Distributed Units (DUs) need to exchange this information and enable the DU to configure advanced 3GPP services on the RUs.

Discovery and Near Real Time Visualization of a Network Timing Topology

The present disclosure enables discovery and near real time visualization of a network timing topology without a need to log in to every network element 12 in the network 10 and without a need to frequently poll network elements 12 for timing related operational information by extending link state interior gateway protocols to distribute and maintain a view of the clock selection status of each link/interface in the network 10 for each of frequency, phase, and time of day clock selection algorithms.

In a network 10 delivering timing information, at any point in time, each network element 12 supporting timing is locked to a single input timing reference interface for any of frequency, phase, and time. Other input references may be configured for frequency, phase, and time to enable a clock selection algorithm to select an alternate input timing reference in the event that the currently selected timing reference becomes invalid or unavailable. For the application requiring timing information, the list of currently selected input references across the network 10 represents the operational timing trail for any of frequency, phase, and time.

Benefits of Visualization of a Network Timing Topology

Some of the many benefits of visualizing the timing topology are as follows:

Timing performance assurance, engineering and troubleshooting—The applications 16 generally require the delivery of timing information for the purpose of maintaining frequency, phase, or time synchronization with other elements in the network 10 within a certain level of accuracy in order to function properly. For example, 3GPP has defined classes of applications in the context of 5G and very stringent targets for time error accuracy across the network for the highest classes of applications. Every network element 12 and transport facility along the timing trail offers the possibility of introducing impairment in the form of jitter, delay variation, noise, wander etc to the overall accuracy of the timing information offered to the application. The ITU-T has specified performance targets for the classification of individual network elements towards determining the possible span of a timing trail in the context of overall application error budgets across a network. Timing topology visualization enables the operator to identify the list of elements and underlying facilities in the current timing topology for consideration of whether it is a suitable topology to achieve the timing performance targets required by the application.

Ascertaining the traceability of an application's active primary timing reference—For example, packet timing distribution technologies such as Precision Time Protocol (IEEE 1588v2) and Synchronous Ethernet (ITU-T G.8262), enable packet transport network elements 12 to deliver timing information by establishing a linear path of master or primary reference to slave relationships across the network between an application requiring timing information and a Grand Master (PTP) or primary reference clock (Synchronous Ethernet). From the vantage point of the application requiring timing information, the network elements 12 and interconnecting links along this path include the timing trail and, under normal network operating conditions, traversing this timing trail from the application requiring timing through the network 10 ultimately leads to the external clock 14 that is serving as the primary reference clock for the application and it is therefore said that the application's timing source is traceable to said primary reference clock. Some or all of the network elements along this timing trail support synchronization features. For applications 16 like telecom applications, it is important to determine that there is a path through the network 10. How timing distribution technologies like precision time protocol and synchronous ethernet technologies are employed to satisfy the requirements of telecom transport applications are specified in profiles such as ITU-T G.8265.1, G.8275.1 and G.8275.2.

Network operation—While not all timing applications require path determinism (example Industrial applications), it is useful to operators to be able to visualize the timing topology. Those skilled in the art will recognize the present disclosure is not limited to telecom timing application but rather extensible to all timing applications where a view of the timing topology is useful. Even in densely distributed timing topology, rapid and easy visualization of the timing topology would be useful to mitigation of events such as the untimely upgrade of a network element that is critical to the timing infrastructure, or enablement of a service that is not yet equipped with a sufficient timing reference.

IGP

An Interior Gateway Protocol (IGP) is a type of protocol used for exchanging routing information between network elements 12. Specific examples of IGPs include Open Shortest Path First (OSPF), Routing Information Protocol (RIP), Intermediate System to Intermediate System (ISIS) and Enhanced Interior Gateway Routing Protocol (EIGRP). A link state topology database provides information towards a topological view that is accessible from a network element's 12 CLI. Examples of link state IGPs include ISIS, OSPF, and hybrid EIGRP.

This disclosure proposes to extend link state IGP such as (but not limited to) ISIS and OSPF to include link state information related to the selection of links as timing references. This enables a near real time view of the timing topology to be available without having to log in to each network element 12, without having to poll operational timing data on each network element 12, and without a dependency on a management station to get a view of the timing topology.

The present disclosure utilizes a link state IGP to distribute timing information for an underlying packet transport network, and this can be regardless of the packet transport technology employed (e.g., Internet Protocol (IP), Multiprotocol Label Switching (MPLS), Ethernet (e.g., provider link state bridging), Optical Transport Network (OTN), etc.

HELLO Packets

In an embodiment, interior gateway HELLO packet protocols are extended to include the negotiation of the capability to exchange timing related information. This enables link state IGP neighbors to negotiate the capability to exchange link state updates that include timing information. For timing ITU profiles such as G.8275.1, HELLO packet protocol lists need not require an Internet Protocol (IP) to operate but this disclosure does not preclude IPv4, IPV6, Segment Routing or other protocols from being in the same IGP instance. For profiles such as G.8275.2 and G.8265.1, it may be beneficial for IP to be present in addition to timing information within the protocol lists of hello packets.

For example, if using the ISIS IGP, the list of supported Network Layer Protocol Identifiers (NLPIDs) would be extended to include a protocol ID for TIME (0xff) (both name and NLPID subject to standards authority allocation) that would allow ISIS systems to indicate capability to exchange updates containing timing link state information. This serves as an illustrative example and is not to imply that this invention is constrained to this specific implementation.

For example, here in an example of a HELLO packet:
IEEE 802.3 Ethernet
Logical-Link Control
ISO 10589 ISIS InTRA Domain Routing Information Exchange Protocol
ISIS HELLO
  Protocols Supported (t=129, l=1)
  Type: 129
  Length: 1
  NLPID(s): IP (0xcc), TIME (0xff)

IGP Link State Updates

In another embodiment, IGP link state updates are extended to include information (perhaps a flag) about whether a link is a selected timing reference or not for each of frequency, phase, and time of day. Any change to the timing selected status of a link would trigger a link state update to be flooded per normal link state IGP operation. Link state updates can contain exclusively timing related information or also include other protocol information depending on implementation for interoperability and scale.

For example, if using the ISIS IGP, the IS reachability for a link would be extended to include a binary flag for Timing Frequency Selected Reference, Timing Phase Selected Reference, Timing ToD Selected Reference that would allow ISIS systems to indicate if the link is a selected timing reference using a value of 1 and if the link is not a selected timing reference using a value of 0. The example below serves as an illustrative example and is not to imply that this invention is constrained to this specific implementation. In this example, the link described by the link state update is a selected timing reference for frequency and phase, but not for time of day (ToD).

For example, a link state update can include
Logical-Link Control
ISO 10589 ISIS InTRA Domain Routing Information Exchange Protocol
ISO 10589 ISIS Link State Protocol Data Unit
  IS Neighbor: 1720.1600.0001.00
  IS neighbor ID: 1720.1600.0001.00
  subTLV: Timing
    Timing Frequency Selected Reference: 1
    Timing Phase Selected Reference: 1
    Timing ToD Selected reference: 0

New Link State Update Message

In the interest of maximal scope with minimal scale impact, IGP link state updates and the equivalent messages in any link state routing protocol can be (but it is not mandatory and also not necessary in single area networks or networks where a management application establishes adjacencies to multiple areas) sent independently to communicate link state changes related to timing and these update messages are given a network scope such that they flood for the purpose of updating their immediate area and additionally flood beyond the equivalent of arear border routers or Level 1-Level 2 routers to also flood for the purpose of updating the equivalent of the OSPF backbone area or ISIS L2 Domain with network wide timing related link state. This maintains a global view of the timing topology in the most powerful core routers where route scale dictates that a network must be divided into areas.

Link State Database

The link state database and the topology database on network elements 12 are enhanced to maintain and be able to display the per link timing topology information learned from above. It is normal link state IGP operation for all network elements 12 in an area to maintain a common view of the link state topology and, by this disclosure, this is leveraged and extended for core nodes to maintain and be able to display a common view of the timing topology as well.

The present disclosure can include dynamic maintenance of IGP topology databases on network elements 12 in core IGP areas/levels to include a synchronized view of network wide link state information about the timing selection status for frequency, phase, and time of day A network element can participate in the IGP at the core level and get enough information to maintain a current view of the timing topology by using only one connection and that is an IGP neighborship. A network element can participate in the IGP at the core level and maintain a current view of the timing topology by receiving IGP updates rather than maintaining polling sessions to each node in the network.

The operator can log in to a single core IGP node via CLI and get topology information that includes timing reference link selection. There is not a need to manually follow/discover the timing trail by logging into nodes recursively. Information about the timing topology and the fit of the node in the timing topology is available by CLI.

Maintenance of Multiple Partial Timing Topologies

Maintenance of multiple partial timing topologies where interoperability is essential. In a mixed vendor network where perhaps an island of network elements that do not yet support this disclosure must be part of the timing topology, it is within link state IGP standards to flood link state updates containing unknown Type Length Values (TLVs) and so the network elements 12 that do support this disclosure can maintain the most accurate topology view possible while maintaining an accurate view of the entry and exit links to such islands. In such cases, it is generally also true that the management station does not have access to the third-party network elements 12 to solicit timing operational information.

Node

Figure 2:
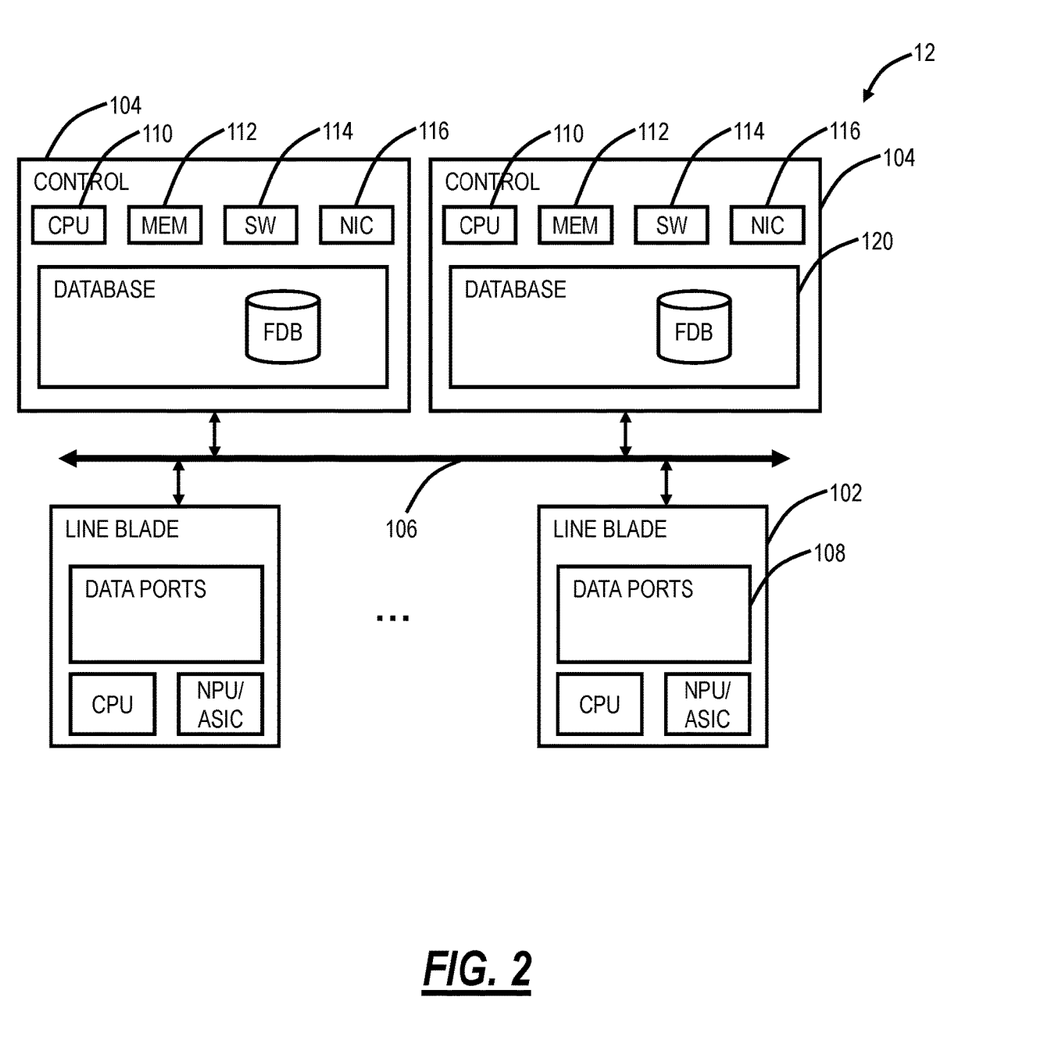
FIG. 2 is a block diagram of an implementation of a network element.

FIG. 2 is a block diagram of an implementation of a network element 12. In this embodiment, the network element 12 is an Ethernet network switch, but those of ordinary skill in the art will recognize the systems and methods described herein can operate with other types of network elements and other implementations. In this embodiment, the network element 12 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the network element 12. Each of the blades 102, 104 can include numerous electronic devices and/or optical devices mounted on a circuit board along with various interconnects including interfaces to the chassis, shelf, etc. Also, FIG. 2 is a logical view and those skilled in the art will recognize other implementations are contemplated. That is, the network element 12 includes ports and a switching fabric between the ports, along with control circuitry.

Two example blades are illustrated with line blades 102 and control blades 104. The line blades 102 include data ports 108, such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108, allowing data traffic to be switched between the data ports 108 on the various line blades 102. The switching fabric is a combination of hardware, software, firmware, etc. that moves data coming into the network element 12 out by the correct port 108 to the next network element 12. "Switching fabric" includes switching units in a node; integrated circuits contained in the switching units; and programming that allows switching paths to be controlled. Note, the switching fabric can be distributed on the blades 102, 104, in a separate blade (not shown), integrated on the line blade 102, or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the network element 12. The network interface 116 may be utilized to communicate with an element manager, a network management system, etc. Additionally, the control blades 104 can include a database 120 that tracks and maintains provisioning, configuration, operational data, and the like. In this embodiment, the network element 12 includes two control blades 104, which may operate in a redundant or protected configuration such as 1:1, 1+1, etc.

Example Processing Device Architecture

Figure 3:
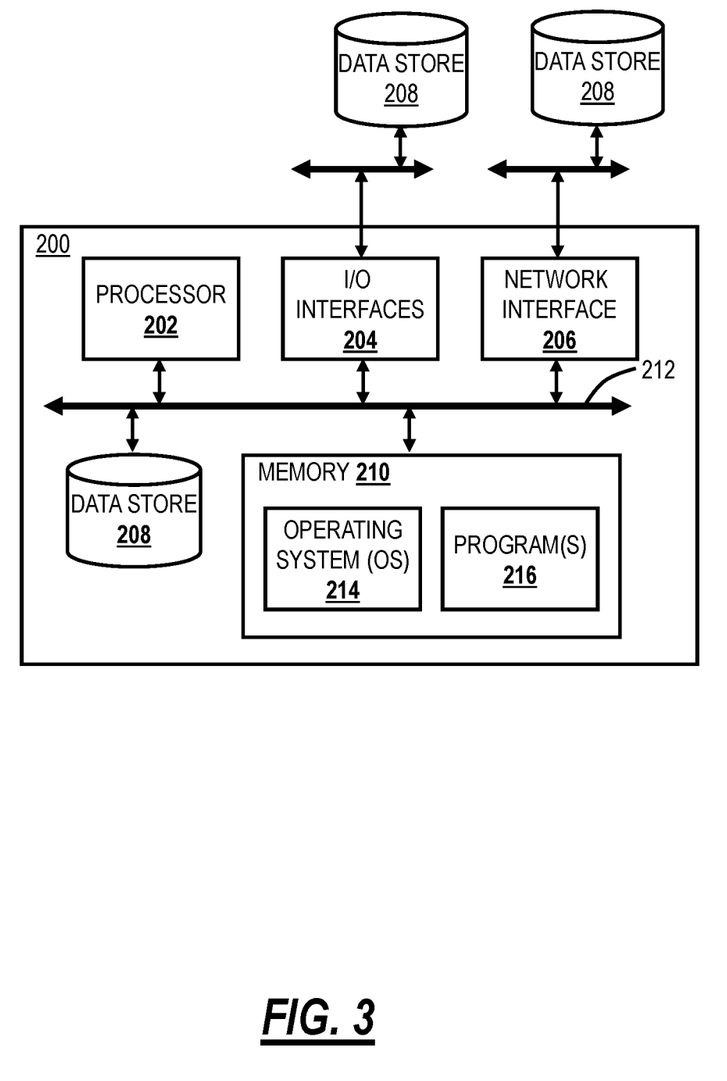
FIG. 3 is a block diagram of a processing device.

FIG. 3 is a block diagram of a processing device 200. The processing device 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the processing device 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the processing device 200, a semiconductor-based microprocessor (in the form of a microchip or chipset), or generally any device for executing software instructions. The processor 202 can include at least one processor as well as multiple processors. When the processing device 200 is in operation, the processor 202 is configured to execute software stored within the memory 210, to communicate data to and from the memory 210, and to generally control operations of the processing device 200 pursuant to the software instructions. The I/O interfaces 204 may be used to receive user input from and/or for providing system output to one or more devices or components.

The network interface 206 may be used to enable the processing device 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the processing device 200, such as, for example, an internal hard drive connected to the local interface 212 in the processing device 200. Additionally, in another embodiment, the data store 208 may be located external to the processing device 200 such as, for example, an external hard drive connected to the I/O interfaces 204 (e.g., SCSI or USB connection). In a further embodiment, the data store 208 may be connected to the processing device 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

In an embodiment, the processing device 200 can be a management station, a Network Management System (NMS), an Element Management System (EMS), an in-skin controller on the network element 12 (in-skin meaning it is located within the network element 12), a Software Defined Networking (SDN) controller, a control plane processor, a route processor, and the like. The processing device 200 can be communicatively coupled to the network 10 and/or the network elements 12. Further, the processing device 200 can participate in receiving the various IGP updates described herein. Also, the processing device 200 can be configured to log into any of the network elements 12 for obtaining timing information in a link state database. Even further, the processing device 200 can be used to display graphically a network view and associated timing trails (in a Graphical User Interface (GUI)) based on the collected information from the various IGP updates described herein.

Process for Timing Topology Discovery and Visualization Using IGPs

Figure 4:
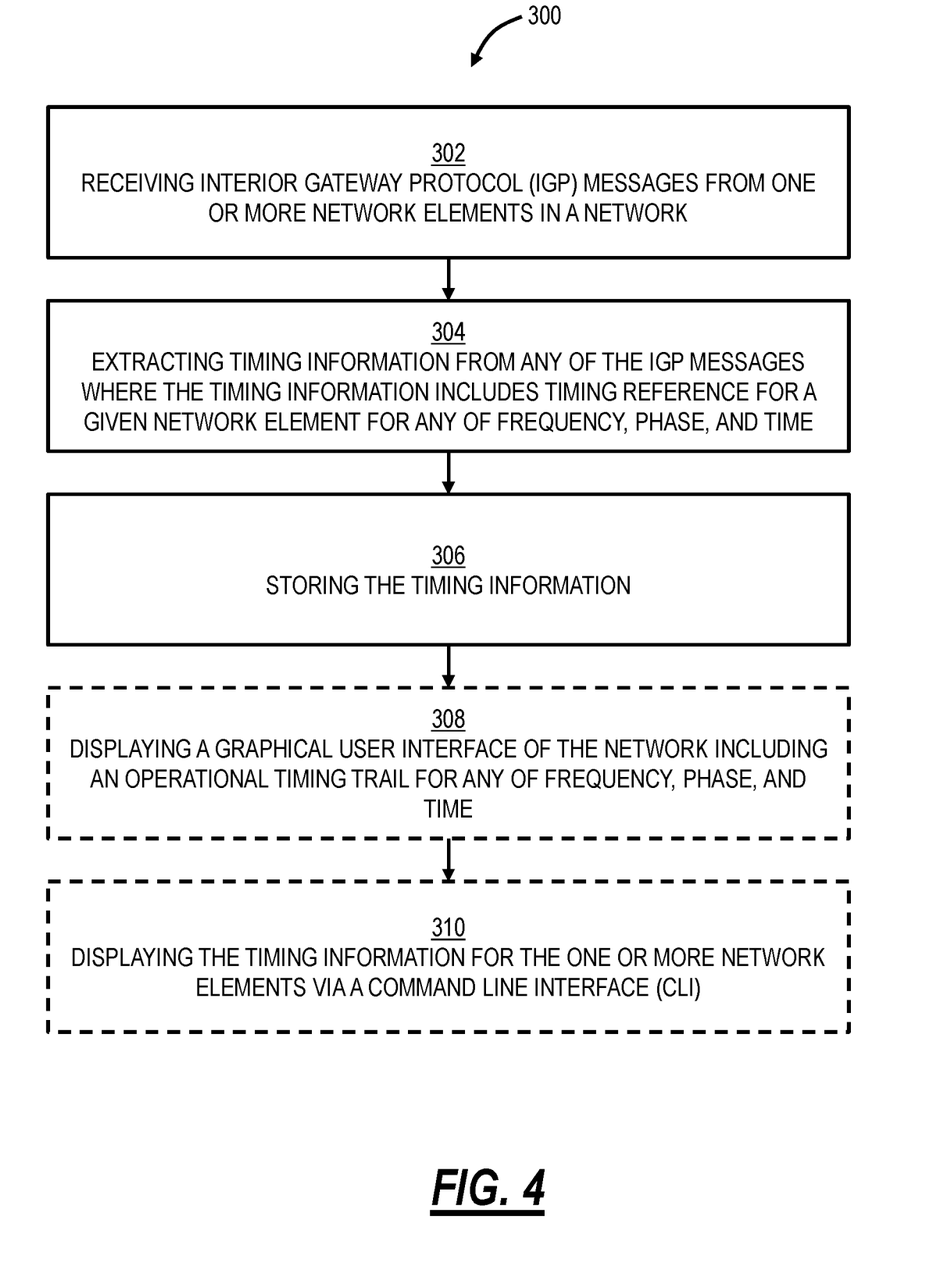
FIG. 4 is a flowchart of a process for timing topology discovery and visualization using IGPs.

FIG. 4 is a flowchart of a process 300 for timing topology discovery and visualization using IGPs. The process 300 contemplates implementation as a method having steps, via the processing device 200 with at least one processor configured to implement the steps, and as a non-transitory computer readable medium storing instructions for implementation of the steps.

The steps include receiving Interior Gateway Protocol (IGP) messages from one or more network elements in a network (step 302); extracting timing information from any of the IGP messages where the timing information includes timing reference for a given network element for any of frequency, phase, and time (step 304); and storing the timing information (step 306). The steps can further include displaying a Graphical User Interface of the network including an operational timing trail for any of frequency, phase, and time (step 308). The steps can further include displaying the timing information for the one or more network elements via a Command Line Interface (CLI) (step 310).

At least one processor can be in a network element of the one or more network elements. The IGP can include one of Open Shortest Path First (OSPF), Routing Information Protocol (RIP), Intermediate System to Intermediate System (ISIS) and Enhanced Interior Gateway Routing Protocol (EIGRP).

The IGP messages can include HELLO packets. The IGP messages can include link state update packets.

The one or more network elements can be configured to insert the timing information into the IGP messages, and wherein the network includes a second set of one or more network elements that are not configured to insert the timing information. The steps can further include ignoring the extracting of the timing information from IGP messages from the second set. The at least one processor can be in a processing device that is separate from the one or more network elements and that is configured to participate in receiving the IGP messages.

In another embodiment, a network element includes a plurality of ports interconnected via a switching fabric; and at least one processor configured to receive Interior Gateway Protocol (IGP) messages from one or more network elements in a network, extract timing information from any of the IGP messages where the timing information includes timing reference for a given network element for any of frequency, phase, and time, and store the timing information.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming at least one processor to perform steps of:
    receiving Interior Gateway Protocol (IGP) messages from one or more network elements in a network;
    extracting timing information directly from any of the IGP messages where the timing information specifies a selected timing reference for a given network element for any of frequency, phase, and time, wherein the timing reference is inserted in the any of the IGP messages and the timing reference identifies an input to a given network element of the one or more network elements the timing reference determines accuracy of a system clock associated with the given network element, the accuracy is a class of the plurality of classes;
    storing the timing information; and
    displaying a Graphical User Interface of the network including an operational timing trail for any of frequency, phase, and time, wherein the operational timing trail includes a path of the one or more network elements illustrating associated timing references.

2. The non-transitory computer-readable medium of claim 1, wherein the steps further include
    displaying the timing information for the one or more network elements via a Command Line Interface (CLI) associated with the one or more network elements.

3. The non-transitory computer-readable medium of claim 2, wherein the at least one processor is in a network element defining a Ethernet network switch of the one or more network elements.

4. The non-transitory computer-readable medium of claim 1, wherein the IGP includes one of Open Shortest Path First (OSPF), Routing Information Protocol (RIP), Intermediate System to Intermediate System (ISIS) and Enhanced Interior Gateway Routing Protocol (EIGRP).

5. The non-transitory computer-readable medium of claim 1, wherein the IGP messages include HELLO packets.

6. The non-transitory computer-readable medium of claim 1, wherein the IGP messages include link state update packets.

7. The non-transitory computer-readable medium of claim 1, wherein the one or more network elements are configured to insert the timing information into the IGP messages, and wherein the network includes a second set of one or more network elements that are not configured to insert the timing information.

8. The non-transitory computer-readable medium of claim 7, wherein the steps further include
    ignoring the extracting of the timing information from IGP messages from the second set.

9. The non-transitory computer-readable medium of claim 1, wherein the at least one processor is in a processing device that is entirely separate and external from the one or more network elements and that is configured to participate in receiving the IGP messages.

10. The non-transitory computer-readable medium of claim 1, wherein the steps include
    displaying an overall accuracy of the operational timing trail based on any of jitter, delay variation, noise, and wander.

11. A method comprising steps of:
    receiving Interior Gateway Protocol (IGP) messages from one or more network elements in a network;
    extracting timing information directly from any of the IGP messages where the timing information specifies a selected timing reference for a given network element for any of frequency, phase, and time, wherein the timing reference is inserted in the any of the IGP messages and the timing reference an input to a given network element of the one or more network elements the timing reference determines accuracy of a system clock associated with the given network element, the accuracy is a class of a plurality of classes;
    storing the timing information; and
    displaying a Graphical User Interface of the network including an operational timing trail for any of frequency, phase, and time, wherein the operational timing trail includes a path of the one or more network elements illustrating associated timing references.

12. The method of claim 11, wherein the IGP includes one of Open Shortest Path First (OSPF), Routing Information Protocol (RIP), Intermediate System to Intermediate System (ISIS) and Enhanced Interior Gateway Routing Protocol (EIGRP).

13. The method of claim 11, wherein the IGP messages include any of HELLO packets and link state update packets.

14. The method of claim 11, wherein the one or more network elements are configured to insert the timing information into the IGP messages, and wherein the network includes a second set of one or more network elements that are not configured to insert the timing information.

15. The method of claim 11, wherein the at least one processor is in a processing device that is separate from the one or more network elements and that is configured to participate in receiving the IGP messages.

16. The method of claim 11, wherein the steps include
displaying an overall accuracy of the operational timing trail based on any of jitter, delay variation, noise, and wander.

17. A network element comprising:
a plurality of ports interconnected via a switching fabric; and
at least one processor configured to
receive Interior Gateway Protocol (IGP) messages from one or more network elements in a network,
extracting timing information directly from any of the IGP messages where the timing information a selected timing reference for a given network element for any of frequency, phase, and time, wherein the timing reference is inserted in the any of the IGP messages and the timing reference identifies an input to a given network element of the one or more network elements the timing determines accuracy of a system clock associated with the given network element, the accuracy is a class of a plurality of classes,
store the timing information, and
cause a display of the network including an operational timing trail for any of frequency, phase, and time, wherein the operational timing trail includes a path of the one or more network elements illustrating associated timing references.

18. The network element of claim 17, wherein the IGP includes one of Open Shortest Path First (OSPF), Routing Information Protocol (RIP), Intermediate System to Intermediate System (ISIS) and Enhanced Interior Gateway Routing Protocol (EIGRP).

19. The network element of claim 17, wherein the IGP messages include any of HELLO packets and link state update packets.

20. The network element of claim 17, wherein the at least one processor is further configured to
cause a display of an overall accuracy of the operational timing trail based on any of jitter, delay variation, noise, and wander in relation to a target accuracy.

* * * * *